United States Patent
Tuohioja

(10) Patent No.: US 9,261,639 B1
(45) Date of Patent: Feb. 16, 2016

(54) COLLIMATING LIGHT GUIDE TEXTURE

(71) Applicant: Modilis Holdings LLC, Wilmington, DE (US)

(72) Inventor: Tero Johannes Tuohioja, Espoo (FI)

(73) Assignee: Modilis Holdings LLC, Wilmington, DE (US)

( * ) Notice: Subject to any disclaimer, the term of this patent is extended or adjusted under 35 U.S.C. 154(b) by 83 days.

(21) Appl. No.: 14/137,187

(22) Filed: Dec. 20, 2013

(51) Int. Cl.
*F21V 7/04* (2006.01)
*F21V 8/00* (2006.01)

(52) U.S. Cl.
CPC ..................................... *G02B 6/0036* (2013.01)

(58) Field of Classification Search
CPC .... G02B 6/0031; G02B 6/005; G02B 6/0055; G02B 6/0076; G02B 6/0018
USPC .................................................. 362/600–634
See application file for complete search history.

(56) References Cited

U.S. PATENT DOCUMENTS

| | | | |
|---|---|---|---|
| 9,022,635 B2* | 5/2015 | Yoon et al. | 362/615 |
| 2014/0063853 A1* | 3/2014 | Nichol et al. | 362/616 |

* cited by examiner

*Primary Examiner* — William Carter
(74) *Attorney, Agent, or Firm* — Lee & Hayes, PLLC

(57) ABSTRACT

An optical display device comprises a light source, a pixelated display panel, and a light guide to collect light from the light source and to transport the light via total internal reflection. A first surface of the light guide includes recessed regions having a circular-based profile, such as a quarter-circle profile, to reflect the light from the light guide to the pixelated display panel. A first optical layer covering at least a portion of the first surface of the light guide fills the recessed regions included in the first surface of the light guide. A second optical layer covering at least a portion of a second surface of the light guide transmits the reflected light to the pixelated display panel.

19 Claims, 6 Drawing Sheets

COLLIMATING LIGHT GUIDE TEXTURE

BACKGROUND

Displays are found in numerous types of electronic devices such as electronic book ("eBook") readers, cellular telephones, smart phones, portable media players, tablet computers, wearable computers, laptop computers, netbooks, desktop computers, televisions, appliances, home electronics, automotive electronics, augmented reality devices, and so forth. Displays may present various types of information, such as user interfaces, device operational status, digital content items, and the like, depending on the kind and purpose of the associated device. The appearance and quality of a display can affect a user's experience with the electronic device and the content presented thereon. Energy consumption of a display can also affect a user's experience regarding battery life and environmental impact. Accordingly, finding ways to enhance user experience and reduce environmental stress continues to be a priority.

Increased multimedia use imposes high demands on designs of displays, as content available for mobile use becomes visually richer. In a liquid-crystal display (LCD), energy efficiency, among other things, can be determined by a backlight or frontlight design. Many transmissive displays use backlights that light a display to enable a viewer to see content on the display that can otherwise be difficult to see without the backlights. In another example, reflective displays use frontlights to improve visibility of content on displays, particularly in low light situations. Displays configured with backlights and/or frontlights can incorporate one or more light guides to direct light from a light source onto or through the display. In some applications, a light source can have a relatively small area, such as in the case of a light emitting diode (LED).

BRIEF DESCRIPTION OF THE DRAWINGS

The detailed description is described with reference to non-limiting and non-exhaustive embodiments illustrated in the accompanying figures. The same reference numerals in different figures refer to similar or identical items.

DETAILED DESCRIPTION

Overview

Figure 1:
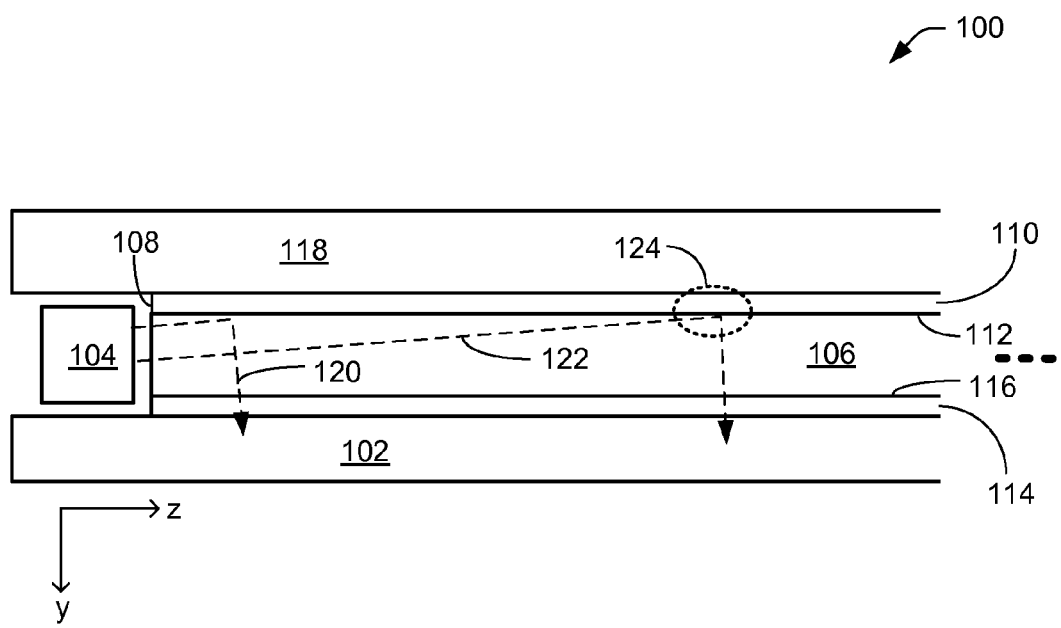
FIG. 1 is a schematic cross-section diagram of a display, according to various embodiments.

In various embodiments described herein, electronic devices include displays for presenting content and other information. In some examples, the electronic devices may also include one or more additional components associated with the display, such as a touch sensor component layered atop the display for detecting touch inputs, a front light or back light component for lighting the display, and/or a cover layer component, which may include antiglare properties, antireflective properties, anti-fingerprint properties, anti-cracking properties, diffusive properties and the like. Various embodiments described herein also include techniques for assembling electronic devices including these component stacks for the displays and other features described herein.

In some examples, the display may include, or may have associated therewith, an outer layer or protective sheet applied during manufacture of the display. The protective sheet is a transparent sheet that overlies and protects an image-displaying component of the display so that the image-displaying component is viewable through the protective sheet. When assembling an electronic device, one or more additional components may be stacked on top of or otherwise coupled to the protective sheet to produce a display assembly of the electronic device. In some cases, the one or more additional components are coupled to the protective sheet by a liquid optically clear adhesive (LOCA) that adheres the additional component(s) to the protective sheet. The LOCA may be cured through photo initiation using ultraviolet (UV) light.

In various embodiments, a light guide can distribute light from a small-area light source to a relatively large area of a display or other device as described herein. For example, a light guide can distribute light from one or more light emitting diodes (LEDs) to regions of a display where the light can be used for illumination, such as backlighting or frontlighting for LCD-based displays (e.g., reflective displays or transmissive displays), electrowetting displays, electrophoretic displays or displays incorporating some color e-inks, just to name a few examples. In particular, a light guide can distribute light uniformly across an area behind or in front of a pixelated display panel. In various implementations, intensity of light that exits a light guide can be modulated or adjusted by a pixelated display panel.

In some embodiments, a light guide has a textured surface including a plurality of redirecting elements that are optical microstructures configured to outcouple (e.g., extract) light rays travelling in the light guide. Individual ones of the redirecting elements can have a concave surface to redirect light rays. The term "microstructure" generally refers to a three-dimensional element located typically on the surface of a lightguide (either as holes or as bumps), having dimensions measured in micrometers. The term "outcouple" generally refers to light being directed out of the bounds of an optical region, such as the light guide. When light rays travelling in the light guide strike the textured surface, the light rays can be diverted to outside the light guide. Such diverted light rays exit the light guide at an angle that is desirably close to normal to the light guide surface. For example, frontlighting or backlighting display applications can operate with light that exits from a surface of a light guide at or less than a relatively small angle (e.g., up to about 30 degrees) from the normal to the surface. Mathematically, a surface "normal" is a unit vector perpendicular (e.g., 90 degrees) to a surface. As used herein, a surface normal is used to provide a reference direction when discussing directions that light rays travel through or reflect from optical materials or structures.

The redirecting elements of the textured surface of a light guide are recessed regions that include a surface having a circular-based profile, such as a quarter-circle profile. For example, the recessed regions can have a cylindrical shape and a cross section of a cylindrical shape represents a circular-based profile in some embodiments. The recessed regions are filled with a material having a refractive index that is lower than a refractive index of the light guide. Light rays travelling in the light guide can be reflected from the redirecting elements based, at least in part, on the difference between these refractive indices. In such reflection, by total internal reflection or specular reflection, light rays reflect from a surface at angles that are the same as angle of incidence of the light rays. The reflected light rays can be outcoupled from the light guide, for example, to a pixelated display panel adjacent to the light guide. A first optical layer covers at least a portion of the textured surface of the light guide. In some implementations, a portion of the first optical layer fills the recessed regions of the textured surface of the light guide. A second optical layer covering at least a portion of a second surface of the light guide (opposite the side having the textured surface) transmits the reflected light rays to the pixelated display panel. The light guide and adjacent optical layers can include any of a number of types of glass or plastic materials, which can be selected based, at least in part, on their respective indices of refraction and other optical properties.

The difference between refractive indices of the light guide and the material filling the recessed regions of the redirecting elements in the light guide determines, at least in part, a particular fashion in which light is reflected from the redirecting elements. In particular, a light ray is outcoupled by being reflected from a circular-based profile, such as a quarter-circle profile, of a redirecting element two or more times.

In some aspects of embodiments described herein, a light guide can generate less than about half the amount of undesirable stray light that can be generated by various blazed gratings. In still other aspects of the embodiments, a light guide can generate relatively low levels (e.g., less than about 5.0%) of back-scattered light compared to various blazed gratings. This feature can be particularly useful in applications that involve opposing light propagating directions. For example, redirecting elements of a textured surface of a light guide can affect light travelling from left to right along the light guide, while the redirecting elements need not (but, in some implementations, can) affect light travelling from right to left. In particular, in this example, light rays travelling from right to left substantially preserve their propagation angles and stay within the light guide while light rays travelling from left to right may be out-coupled out of the light guide. Accordingly, a single light guide can be used for multiple purposes at the same time. For example, the light guide can simultaneously transfer infrared (IR) signals from ambient sensors or use two light sources on opposite ends of the light guide and create isolated areas that are sensitive to only one of the two light sources. This makes it possible to change the appearance of an illuminated area by changing which light source is active. This could be used, for example, to create form-changing illuminated icons.

In some embodiments, a light guide need not be surrounded by air or other gas having an index of refraction near 1.0 (e.g., below about 1.2) to properly operate. Instead, the textured light guide is operable while being hermetically sealed (e.g., to keep air away from the light guide) with one or more plastic or glass layers having refractive indices greater than about 1.3, for example. In some embodiments, a light guide includes redirecting elements that can outcouple light beams that travel in the light guide at relatively small angles (e.g., less than about 25° from the plane of the light guide). In other words, the redirecting elements can change the direction of travel of light rays by about 90°±30°. These and other benefits can be important for any of a number of applications, such as backlighting or frontlighting for relatively large LCD-based displays, or displays that incorporate relatively thin optical foils or layers.

In some embodiments, a textured light guide as described herein can be incorporated in a display. Such a display can comprise a portion of a system that includes one or more processors and one or more computer memories. Display software can be stored on the one or more memories and can be operable with the one or more processors to modulate light rays that are out-coupled from the light guide of the display. For example, display software can include code executable by a processor to modulate optical properties of individual pixels of a display based, at least in part, on electronic signals representative of image or video data. The code can cause the processor to modulate the optical properties of pixels by controlling electrical signals (e.g., voltages, currents, fields, and so on) on, over, or in layers of a display.

Light discussed in embodiments need not be limited to the visible portion of the spectrum. Instead, light can include electromagnetic radiation in any portion of the spectrum, including ultra-violet, visible, and infrared. For example, a display including a textured light guide can operate in any portion of the electromagnetic spectrum.

Illustrative Environment

FIG. 1 is a schematic cross-section diagram of a portion of a display 100, according to various embodiments. Display 100 includes a display panel 102, such as a reflective or transmissive LCD-based display panel. Herein, the term "display" refers to a structure that includes a number of optical elements and a display panel, as shown by the example embodiment of FIG. 1. In other embodiments, however, a display need not include a light source. A light source 104 can provide backlighting or frontlighting to display panel 102 via a light guide 106, which can uniformly distribute light from light source 104. In some implementations, light source 104 can have a relatively small area as compared to a relatively large area of display panel 102. For example, light guide 106 can distribute light from the small area of light source 104, which can include one or more light emitting diodes (LEDs) to the larger area of display panel 102. An end-face 108 of light guide 106 can capture a relatively large portion, if not all, of light emitted from light source 104. In some implementations, light source 104 can include more than one light source positioned adjacent to various portions of edges of light guide 106.

Some embodiments are described herein with reference to figures that include orthogonal coordinate axes x, y and z. Unless otherwise stated, the planer structure of a light guide (e.g., light guide 106) and associated optical layers are oriented in the x-z plane. In FIG. 1, for example, x is directed out of the figure and display 100 is oriented in the x-z plane. Of course, claimed subject matter is not limited to such orientations with respect to coordinate axes. Instead, orthogonal coordinate axes x, y and z are used herein for convenience and to aid in describing example embodiments. Also for sake of convenience, directions are described as "up", which is in the negative y-direction, and "down", which is in the positive y-direction. Descriptions such as "up," "down," "horizontal,"

"vertical," "top" or "bottom" are used for describing relative directions but are not intended to be related to the direction of gravity.

Light guide 106 is at least partially covered with a first optical layer 110 on a first surface 112 of light guide 106 and with a second optical layer 114 on a second surface 116, which is opposite first surface 112, of light guide 106. In some implementations, first optical layer 110 is laminated onto first surface 112 of light guide 106 and second optical layer 114 is laminated onto second surface 116. In some embodiments, the term "light guide" refers to the combination of light guide 106 and first optical layer 110 and/or second optical layer 114, while in other embodiments the term "light guide" refers to light guide 106 sans first optical layer 110 and second optical layer 114. Second optical layer 114 has a refractive index that is lower than that of light guide 106 so that light travelling in light guide 106 internally reflects from the interface between optical layer 114 and light guide 106. Display 100 also includes a cover layer 118, such as a cover glass to physically and chemically protect display 100 from external elements. In some implementations, diffusers (not shown) can be placed between light guide 106 and display panel 102.

First surface 112 of light guide 106 includes a plurality of redirecting elements that form a textured surface, as shown in figures that follow. The redirecting elements outcouple light travelling in light guide 106 toward display panel 102. When light rays travelling in light guide 106 strike the textured surface, the light rays can be diverted to outside light guide 106. Such diverted light rays exit the light guide at an angle that is desirably close to normal to the light guide surface. For example, FIG. 1 illustrates light rays 120 and 122 travelling from light source 104, entering light guide 106 at end-face 108, reflecting from redirecting elements of first surface 112 of light guide 106, transmitting through second optical layer 114, and impinging on display panel 102. Light impinging on display panel 102 can be modulated or adjusted by the (pixelated) display panel.

Figure 2:
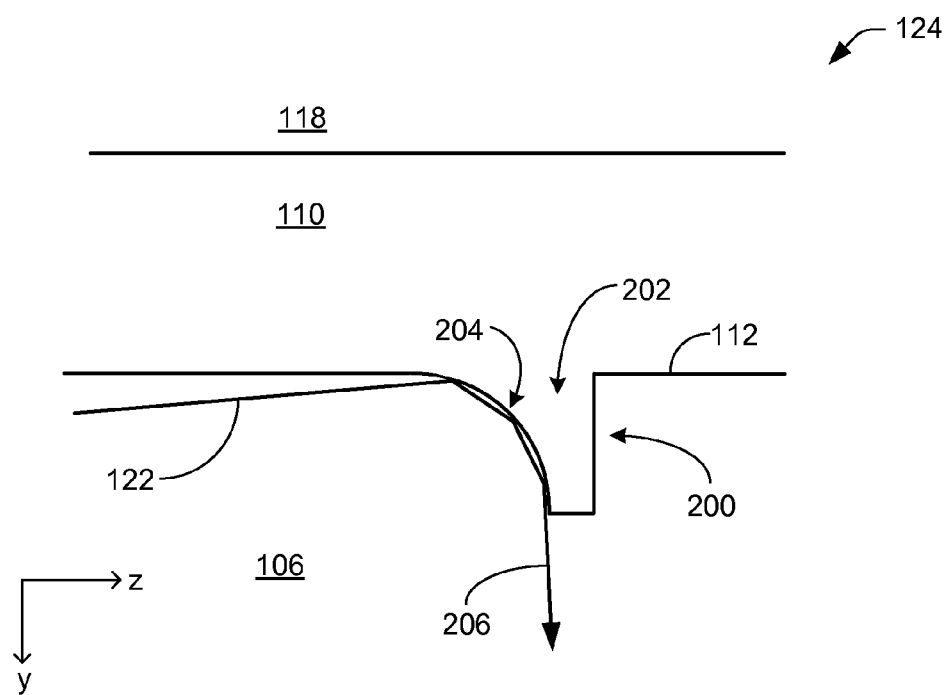
FIG. 2 is a close up view of a region of a textured surface of a light guide, according to various example embodiments.

FIG. 2 illustrates a close-up view of a region 124, depicted in FIG. 1, of light guide 106, according to various example embodiments. In particular, region 124 includes a redirecting element 200 that is one of a plurality of redirecting elements that form a texture on first surface 112 of light guide 106. Collimating element 200 includes a recessed region 202 having a circular-based profile, such as a quarter-circle profile. Such a profile need not be precisely a quarter of a circle. For example, a "quarter-circle" profile can have an arc length from about 20% to about 30% of the circumference of a corresponding whole circle. Such a profile also need not be precisely circular. For example, the "quarter-circle" profile can deviate from a circular arc such that its radius varies by about ±10%. Recessed region 202 is filled with a material having a lower refractive index compared to a refractive index of light guide 106. In some implementations, recessed region 202 is filled with material of first optical layer 110. In other implementations, recessed region 202 is filled with material that is different from material of first optical layer 110. Light ray 122 travelling in light guide 106 reflects from redirecting element 200 based, at least in part, on the difference between refractive indices of light guide 106 and the material filling redirecting element 200. The reflected light ray 122 outcouples from light guide 106 after reflecting two or more times from a curved surface having a circular-based profile, such as quarter-circle surface 204. Light ray 122 is thus reflected into an outcoupled light ray 206 that is desirably close to normal to second surface 116 of light guide 106. Outcoupled light ray 206 is directed toward display panel 102.

Figure 3:
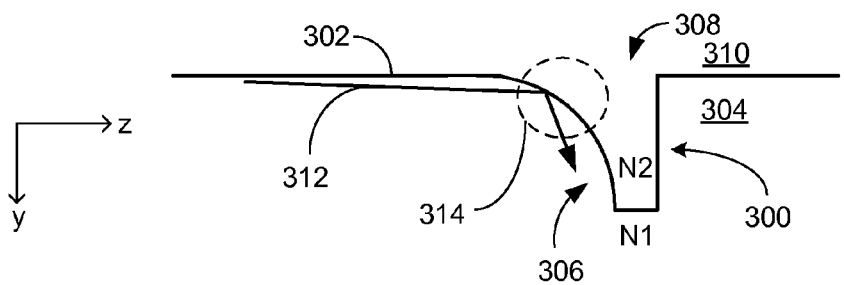
FIG. 3 illustrates conditions for reflection and transmission for a redirecting element of a textured surface of a light guide, according to various example embodiments.

FIG. 3 shows a cross-section view of a redirecting element 300 of a textured surface 302 of a light guide 304, according to various example embodiments. Collimating element 300 includes a curved surface having a circular-based profile, such as a quarter-circle profile 306 and a recessed region 308. Light guide 304 is at least partially covered with a first optical layer 310. Material of first optical layer 310 fills recessed region 308. Light guide 304 has a refractive index N1 and first optical layer 310 has a refractive index N2. A light ray 312 is shown travelling in light guide 304 and reflecting from quarter-circle profile 306 of redirecting element 300. Region 314 includes a portion of quarter-circle profile 306.

Figure 4:
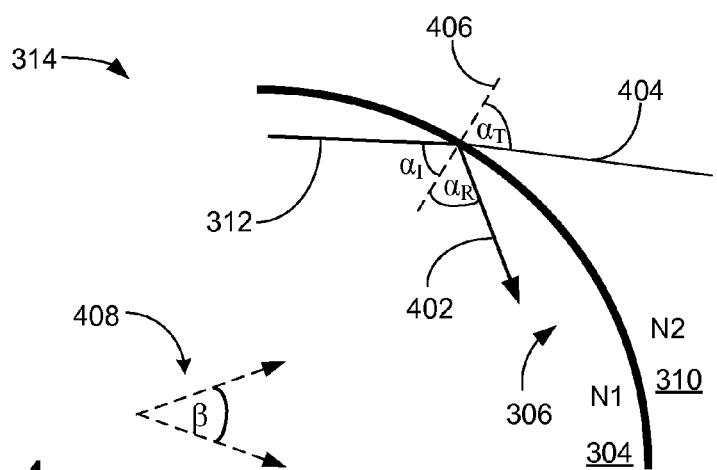
FIG. 4 is a close up view of a region of a textured surface of a light guide, according to various example embodiments.

FIG. 4 is a close-up view of region 314 that includes a portion of quarter-circle profile 306 reflecting light ray 312, as shown in FIG. 3. Light ray 312 strikes the surface of quarter-circle profile 306 of redirecting element 300 at an incident angle $\alpha_I$. In a general case, a reflected portion 402 of light ray 312 reflects (via Fresnel reflection) from the surface at a reflection angle $\alpha_R$ and a transmitted portion 404 transmits at a transmission angle $\alpha_T$. These angles are measured from a reference direction 406 that is normal to the surface. Snell's Law, which is a function of the refractive indices N1 and N2, relates angle $\alpha_I$ and angle $\alpha_T$: $N1*\sin \alpha_I = N2*\sin \alpha_T$. Moreover, the Law of Reflection leads to specular Fresnel reflection, where $\alpha_I = \alpha_R$. An increasing incident angle $\alpha_I$ leads to a condition of Total Internal Reflection (TIR) at a critical angle $\alpha_C$ (not shown), where the power or intensity of transmitted portion 404 diminishes to zero while angle $\alpha_T$ approaches an angle (90°) that is parallel to the surface. Accordingly, incident angles $\alpha_I$ greater than $\alpha_C$ reflect the entire incident light ray 312 at an angle of $\alpha_R$.

In some embodiments, incident angles $\alpha_I$ of the incident light ray 312 are determined, at least in part, by refractive indices N1 and N2 of light guide 304 and first optical layer 310, respectively. Thus, based in part on these refractive indices, light rays travel in light guide 304 at angles within a distribution of angles, as indicated by arrows 408 separated by an angle β. Light rays at angles outside this distribution at least partially escape (e.g., transmit out of) light guide 304 while light rays at angles inside this distribution remain in (e.g., via TIR) light guide 304. For example, for N1=1.49 and N2=1.41, an average of the distribution of angles that light rays travel in light guide 304 is about 18°. In this example, β is about 36°. Thus, light ray 312 travelling in light guide 304 can encounter redirecting element 300 at an angle from about 18° below horizontal (e.g., the z-axis direction) to about 18° above horizontal.

Figure 5:
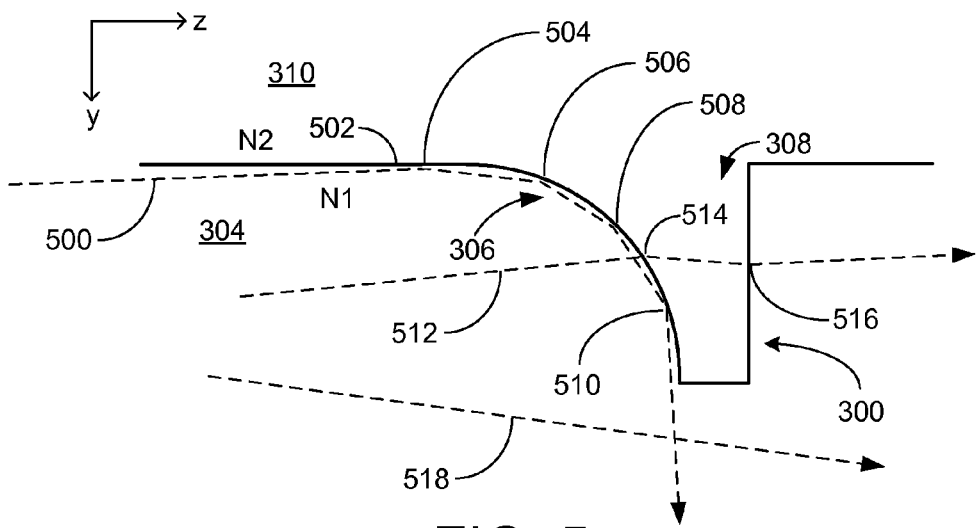
FIG. 5 illustrates behavior of various light rays near a redirecting element of a textured surface of a light guide, according to various example embodiments.

FIG. 5 illustrates behavior of various light rays near redirecting element 300 of light guide 304, according to various example embodiments. Different light rays can behave differently from one another, depending in part on which portion of redirecting element 300 the light rays strike.

As explained above, light ray 500 can travel in light guide 304 at angles within a distribution of angles. Returning to the numerical example above where N1=1.49 and N2=1.41, an average of a distribution of angles that light rays travel in light guide 304 is within about 18° from horizontal. Thus, light ray 500 travelling in light guide 304 can encounter redirecting element 300 at an angle of about 18° above horizontal. Light ray 500 reflects, via TIR, from a surface 502 of light guide 304 at point 504. Light ray 500 subsequently encounters a quarter-circle profile of redirecting element 300 at point 506. Since the refractive index of material in recessed region 308 can be the same as or similar to the refractive index N2 of first optical layer 310, incident and reflected angles of light ray 500 (e.g., $\alpha_I$ and $\alpha_R$) are about 18° in this example. Light ray 500, originally travelling along light guide 304 at an angle within about 18° of horizontal, can be diverted to a new direction substantially downward along the y-axis by multiple reflections from redirecting element 300. In particular, using this numerical example, light ray 500 is reflected from the quarter-circle profile 306 of redirecting element 300 two or more times. The number of reflections involved in diverting light ray 500 to be outcoupled from light guide 304 is determined by considering that light ray 500 travels along light guide at an angle of about 18° from horizontal when light ray 500 first strikes and reflects from quarter-circle profile 306 of redirecting element 300. Reflection of light ray 500 from this first strike (at point 506) diverts light ray 500 by about 18°. Similarly, each subsequent reflection at point 508 and at point 510 adds about 18° to the direction of travel of light ray 500. These three reflections lead to an angle of travel of light ray 500 of about 72° below horizontal. A fourth reflection subsequently leads to an angle of travel of light ray 500 of about 90° below horizontal, in the y-direction. Thus, in this particular numerical example, light rays travelling in light guide 304 are outcoupled at an angle that is at least approximately normal to a surface of light guide 304 by reflecting from redirecting element 300 two or more times.

Light ray 500 is an example of a light ray that encounters redirecting element 300 relatively near surface 502 (e.g., the "base" of redirecting element 300). The portion of the curved surface having a circular-based profile, such as the quarter-circle profile of redirecting element 300 near surface 502 has relatively small angles with respect to the z-axis and with respect to an angle of incidence of light rays travelling in light guide 304. For example, angles of the quarter-circle profile surface from which light ray 500 reflects are less than about 10° from the z-axis. These small angles are favorable for outcoupling light rays that encounter redirecting element 300 relatively near surface 502, as in the case for light ray 500. On the other hand, though light ray 512 travelling in light guide 304 encounters redirecting element 300 at an incident angle similar to that of light ray 500 (e.g., about 18° above the z-axis direction), light ray 512 first encounters the quarter-circle profile of redirecting element 300 at point 514, which is midway along the quarter-circle profile, and relatively far from surface 502. Accordingly, light ray 512 is incident on a surface of the quarter-circle profile that has a relatively steep angle with respect to the z-axis. The incident angle of light ray 512 at point 514 is too small (with respect to the surface normal) for TIR. Thus, substantially the entire light (excluding Fresnel loss) ray 512 transmits into redirecting element 300, experiencing a relatively small refractive deviation at point 514 based on Snell's Law. In detail, a relatively small portion (e.g., Fresnel loss portion) of light ray 512 is reflected from the surface of the quarter-circle profile based, at least in part, on optical properties of light guide 304 and redirecting element 300. Such reflected light can lead to undesirable scattering of the light that is outcoupled from light guide 304 and/or continues to travel within light guide 304 (albeit with an angle that is different from original light ray 512).

After transmitting through the quarter-circle profile and into redirecting element 300 at point 514, light ray 512 travels through redirecting element 300 and is subsequently refracted at point 516 along an interface between a backside of redirecting element 300 and light guide 304. Light ray 512 then continues to travel in light guide 304 with a slightly changed angle (as compared to its angle before encountering redirecting element 300) and can be directed out of light guide 304 when light ray 512 encounters subsequent redirecting elements. In some case, of course, light ray 512 may travel in light guide 304 for a relatively far distance (e.g., missing a number of redirecting elements and experiencing a number of TIRs from surfaces of light guide 304) before light ray 512 encounters a redirecting element at a portion of a quarter-circle profile of the redirecting element that leads to outcoupling.

Light ray 518 is an example of a light ray that misses redirecting element 300. Accordingly, redirecting element 300 does not affect travel direction of light ray 518. Light ray 518 continues to travel in light guide 304 and can be directed out of light guide 304 when light ray 518 encounters subsequent redirecting elements. In some instances, light ray 518 may travel in light guide 304 for a relatively far distance (e.g., missing a number of redirecting elements and experiencing a number of TIRs from surfaces of light guide 304) before light ray 518 encounters a redirecting element at a portion of a quarter-circle profile of the redirecting element that leads to outcoupling.

Figure 6:
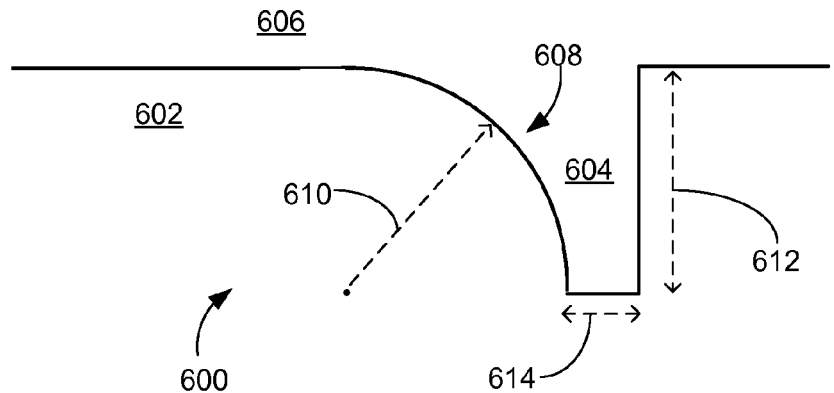
FIG. 6 illustrates relative dimensions of a redirecting element of a textured surface of a light guide, according to various example embodiments.

FIG. 6 illustrates relative dimensions of a redirecting element 600 of a textured surface of a light guide 602, according to various example embodiments. Collimating element 600 includes a recessed region 604 filled with a material having a particular refractive index, which can be the same as a refractive index for an optical layer 606 that at least partially covers light guide 602. For example, in some implementations, a portion of optical layer 606 fills recessed region 604. In other implementations, recessed region 604 is filled in a first process with a material that is the same as or different from material of optical layer 606 and, in a second subsequent process, covered by optical layer 606, as described below.

Collimating element 600 includes a curved surface having a circular-based profile, such as a quarter-circle profile 608 that is an interface between light guide 602 and recessed region 604. Quarter-circle profile 608 has a radius of curvature 610 that is desirably at least approximately equal to a height 612 of redirecting element 600. Radius of curvature 610 is defined as a distance from a circular arc to a center of a circle that includes at least a portion of the circular arc. A width 614 can be in a range of values that is convenient for fabricating quarter-circle profile 608, light guide 602, and recessed region 604. For example, width 614 can be sufficiently large (e.g., about 1.0 to 1.5 micrometers) so as to easily allowed material to fill recessed region 604 without trapping air pockets. In another example, width 614 may be determined by a process used to form recessed region 604. In a specific example, an etching process to form recessed region 604 may lead to a particular width 614 (or range of widths because of process tolerances) resulting from process parameters used to form quarter-circle profile 608.

In some embodiments, height 612 is in a range of about 1.0 micrometer to about 10 micrometers. Accordingly, radius of curvature 610 is in a range of about 1.0 micrometer to about 10 micrometers. In some particular cases, height 612 can be about 1% of the thickness of light guide 602. Width 614 can be in a range of about 1.0 micrometer to about 10 micrometers, though claimed subject matter need not be so limited.

In some embodiments, if redirecting element 600 of a textured surface of light guide 602 used in a display has a height above about 10 or 20 microns, contrast ratio of the display can be adversely affected. This is because, at least in part, as the size of redirecting element 600 increases, its visibility increases. The higher visibility adversely affects contrast ratio of the display.

Figure 7:
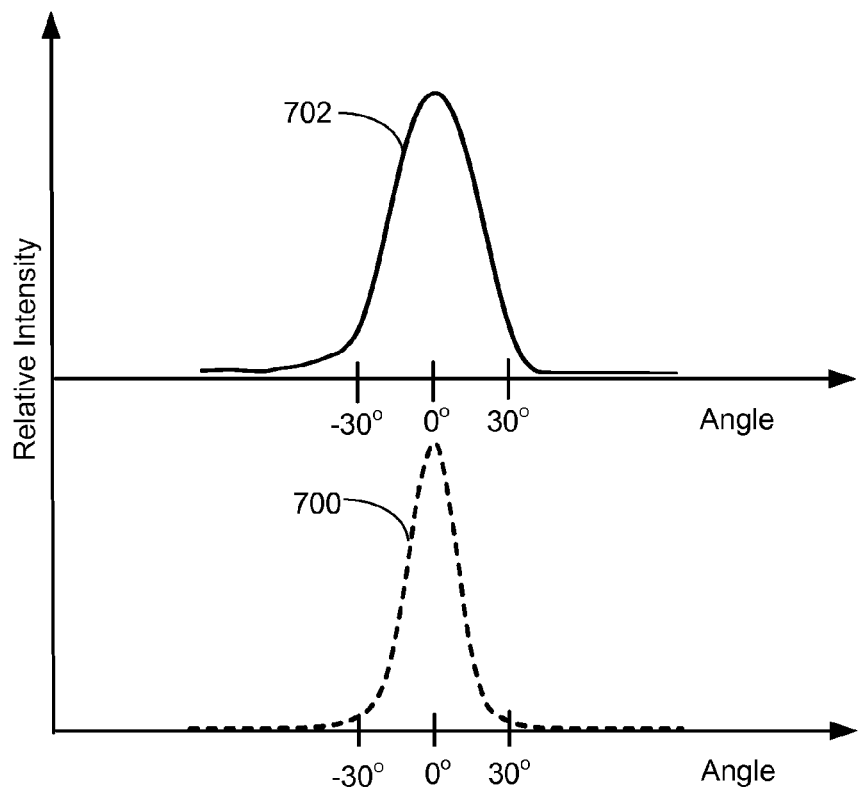
FIG. 7 illustrates intensity distributions as a function of collimation angle for light travelling in a light guide, according to various example embodiments.

FIG. 7 illustrates a relative intensity distribution as a function of collimation angle for light travelling in, or being outcoupled from, a light guide, according to various example embodiments. Distribution curve 700 is the relative intensity distribution for light travelling in a light guide, such as light guide 304, for example. Angles for distribution curves 700 and 702 are measured relative to the normal of the light guide, as labeled by the y-axis in FIGS. 1-4, for example. In particular, angles for distribution curve 700 are measured relative to the normal to the plane of the light guide along the x-axis (e.g., distribution curve 700 is plotted in the x-y plane). Angles for distribution curve 702 are measured relative to the normal to the plane of the light guide along the z-axis (e.g., distribution curve 702 is plotted in the y-z plane). The relatively narrow intensity distributions shown by distribution curves 700 and 702 can be broadened by placing diffusers between a light guide and a display panel (e.g., between light guide 106 and display panel 102, shown in FIG. 1).

As explained above, based in part on refractive indices of the light guide and optical layers at least partially covering the light guide, light rays travel in the light guide at angles within a distribution of angles, as indicated by arrows 408 separated by an angle β, shown in FIG. 4, for example. Light rays at angles outside this distribution escape (e.g., transmit out of) the light guide while light rays at angles inside this distribution remain in (e.g., via TIR) the light guide. For example, if the refractive index of the light guide is about 1.49 and the refractive indices of optical layers covering the light guide are about 1.41, an average of the distribution of angles that light rays travel in the light guide is about 18°. In this case, β is about 36°, which is at least approximately equal to the width (e.g., full-width at half-max, FWHM) of the distribution curve 700. Thus, light rays travelling in the light guide most likely encounter redirecting elements at angles from about 18° below a z-axis direction to about 18° above the z-axis direction.

Distribution curves 700 and 702 are the relative intensity distributions for light outcoupled from the light guide, subsequent to reflecting from redirecting elements of a textured surface of the light guide. As described above, the textured surface includes a plurality of redirecting elements (e.g., redirecting element 600) that outcouple light travelling in the light guide to angles close to normal to a surface of the light guide. Distribution curves 700 and 702 show that, for some particular embodiments, light is predominantly outcoupled from the light guide at a distribution of angles in a range from about −30° to about +30° from normal.

Figure 8:
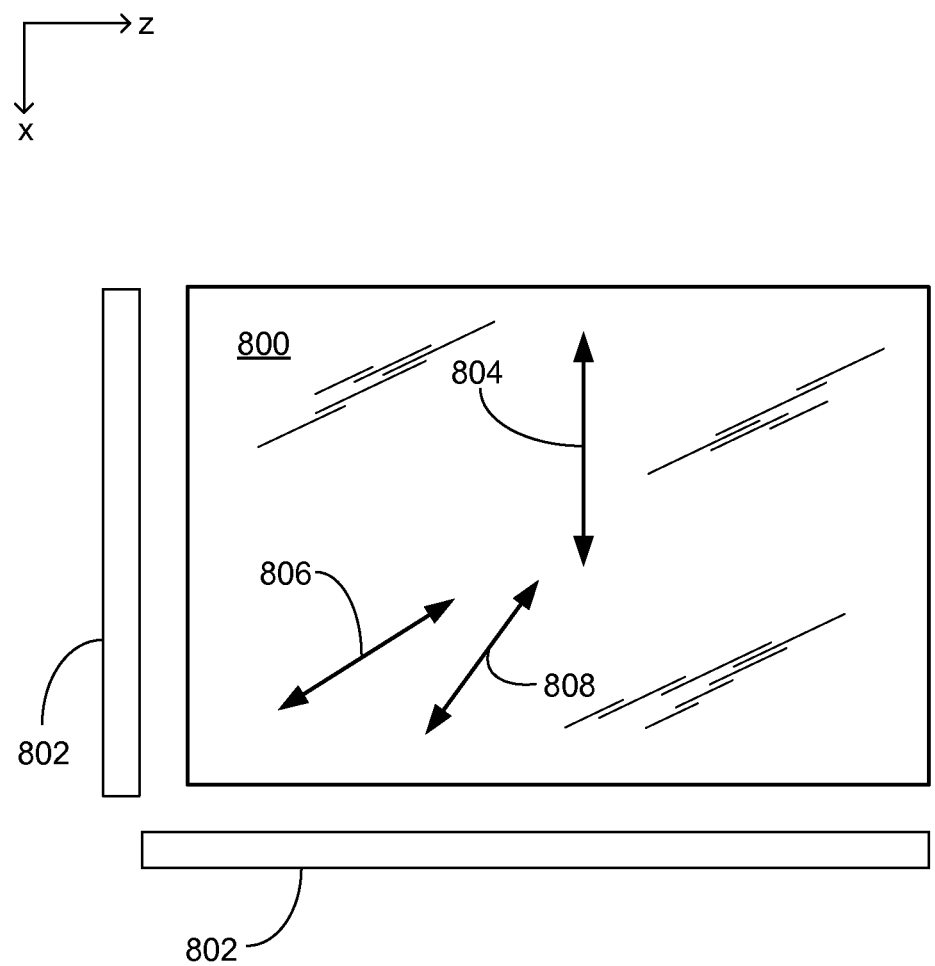
FIG. 8 is a plan view of a display panel and light source, according to various example embodiments.

FIG. 8 is a plan view of a display 800 and light source 802, according to various example embodiments. Display 800 includes underlying structures such as a pixelated display panel (e.g., display panel 102 shown in FIG. 1) and a light guide having a textured surface that includes a plurality of redirecting elements. Light source 802 can have any of a number of configurations, such as, for example, a series of LEDs aligned along one or more edges of display 800.

The pixelated display panel of display 800 includes rows and columns of pixels. For example, directions of the columns of pixels are indicated by arrow 804. The pixel rows are perpendicular to the columns. To avoid a Moire effect, redirecting elements of the light guide may be dithered to oriented the redirecting elements in directions that do not coincide with directions of the rows and columns of pixels in the display panel. For example, redirecting elements may be placed in an irregular pattern with respect to the rows and columns of pixels in the display panel. Dithering may also be applied by slightly moving the pixels with respect to one another to avoid the Moire effect. Dithering, which can be random or diffusive, can be generated using, for example, the Floyd-Steinberg diffusion dithering algorithm.

In addition, the orientation of redirecting elements can be rotated with respect to one another. In other words, the directions faced by the concave surfaces of the redirecting elements can vary. For example, if the concave surfaces of a first set of redirecting elements face a direction along an arrow 806, concave surfaces of a second set of redirecting elements can face another direction along an arrow 808, and so on.

Arrows 806 and 808 indicate a general direction of placement of redirecting elements. For example, redirecting elements are placed in rows that are in the general direction of any of arrows 806, which are neither parallel nor perpendicular to arrow 804 (e.g., the direction of the columns of pixels). The direction of arrows 806 can be determined, at least in part, by a location (or locations) of light source 802. In another example, redirecting elements can be placed in irregular patterns and orientations that are not assignable to any grid-like pattern. Such relative placement of pixels of the display panel and redirecting elements of the light guide avoids a Moire effect. In yet another example, redirecting elements can be distributed across display 800 with varying density. For instance, such varying density can accommodate a changing intensity of light from light source 802 travelling in the light guide of display 800. In general, the intensity of light will be greater in the light guide closer to light source 802. Accordingly, for uniform illumination, redirecting elements can be distributed across display 800 with a density that decreases closer to light source 802.

Figure 9:
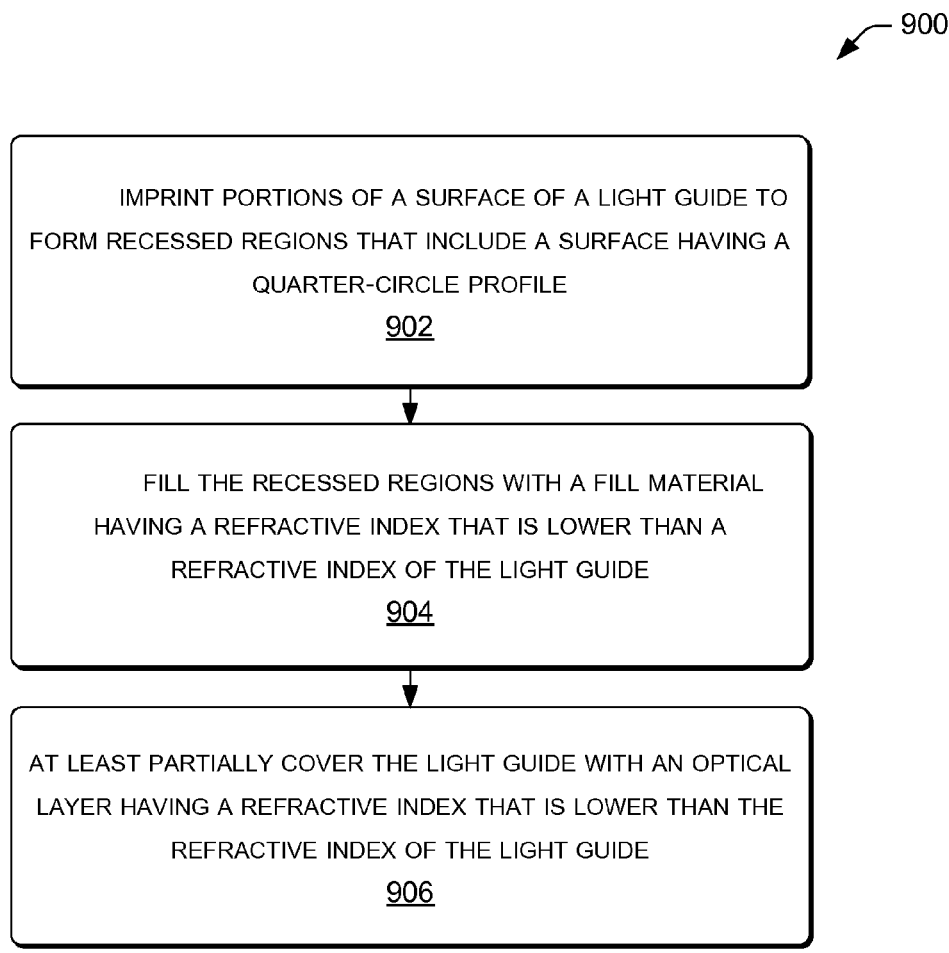
FIG. 9 is a flow diagram of a process for fabricating a display panel, according to various example embodiments.

FIG. 9 is a flow diagram of a process 900 for fabricating a display, according to various example embodiments. For example, the display can be similar to or the same as display 100, which includes light guide 106 and first optical layer 110, shown in FIG. 1. At block 902, portions of a surface of the light guide are embossed or imprinted to form recessed regions that include a surface having a curved surface having a circular-based profile, such as a quarter-circle profile. In some implementations, recessed regions can be formed by etching using a chemical process or a reactive ion type etch to remove material. The optical quality (e.g., smoothness) from etching, however, may not be as favorable as the optical quality from embossing or imprinting. The surface having the quarter-circle profile of the recessed regions is configured to outcouple light rays travelling in the light guide film by reflecting the light rays two or more times. FIG. 5 illustrates an example of a recessed region 504 and a quarter-circle profile 508. In some implementations, a depth of the recessed regions is at least approximately equal to a radius of curvature of the quarter-circle profile.

At block 904, the recessed regions are filled with a fill material having a refractive index that is lower than a refractive index of the light guide. At block 906, the light guide is at least partially covered with an optical layer having a refractive index that is lower than the refractive index of the light guide. In some implementations, the refractive index of the optical layer is the same as the refractive index of the fill material. Examples of materials from which the light guide, the fill material, and the optical layer can be made include PMMA, transparent polyester, such as polyethylene terephthalate (PET) or polyethylene naphthalate (PEN), or other suitable transparent polymer film or sheet, such as a polycarbonate or a cyclic olefin copolymer (COC).

Figure 10:
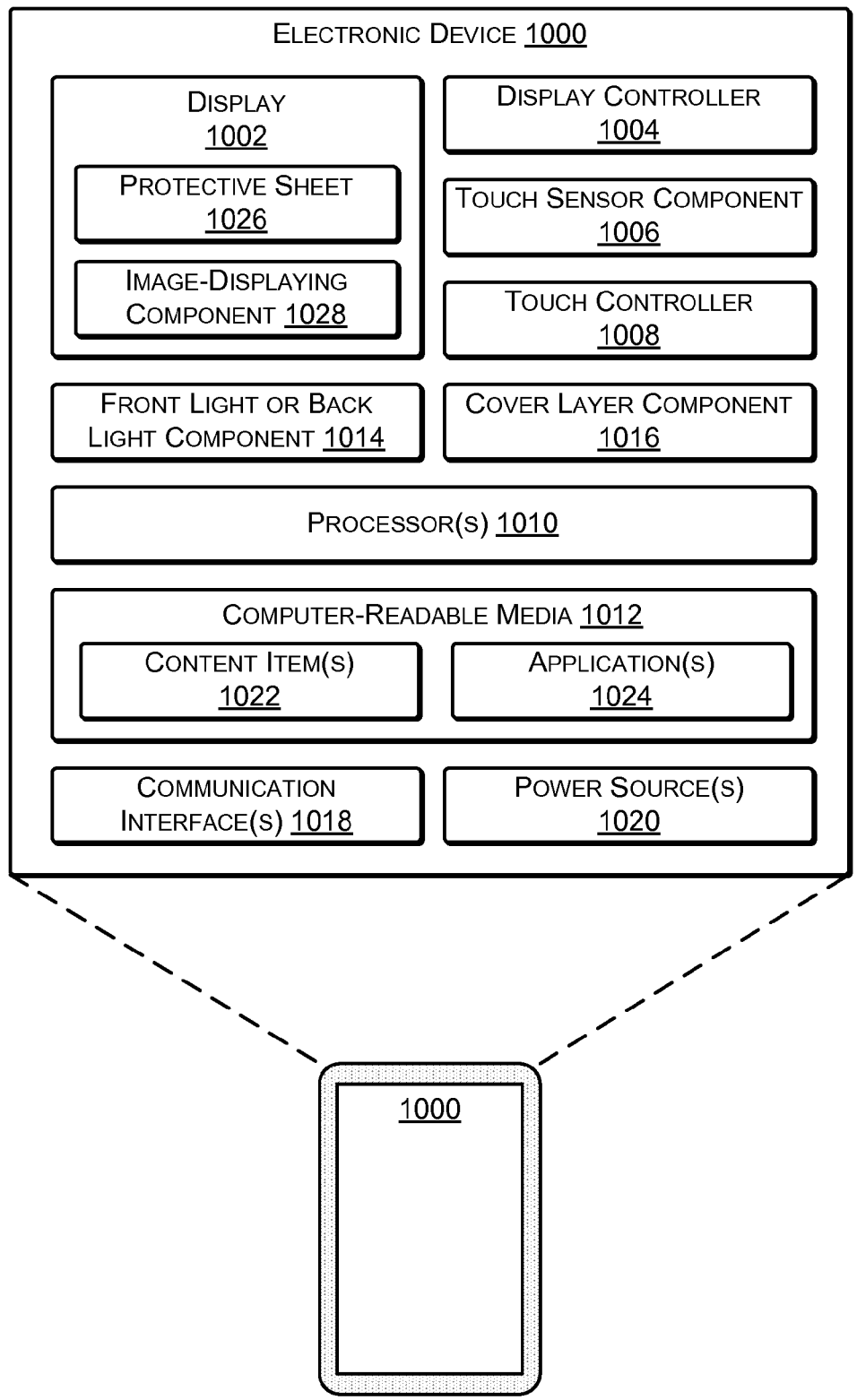
FIG. 10 illustrates an example electronic device equipped with a light guide, according to some embodiments.

FIG. 10 illustrates an example electronic device 1000 that may include the example display assemblies or structures discussed above. The device 1000 may comprise any type of electronic device having a display. For instance, the device 1000 may be a mobile electronic device (e.g., an electronic book reader, a tablet computing device, a laptop computer, a smart phone or other multifunction communication device, a portable digital assistant, a wearable computing device, an automotive display, etc.). Alternatively, the device 1000 may be a non-mobile electronic device (e.g., a computer display, a television, etc.). In addition, while FIG. 10 illustrates several example components of the electronic device 1000, it is to be appreciated that the device 1000 may also include other conventional components, such as an operating system, system busses, input/output components, and the like. Further, in other examples, such as in the case of a television or computer monitor, the electronic device 1000 may only include a subset of the components shown.

Regardless of the specific implementation of the electronic device 1000, the device 1000 includes a display 1002 and a corresponding display controller 1004. The display 1002 may represent a reflective display in some instances, such as an electronic paper display, a reflective LCD display, or the like. Electronic paper displays represent an array of display technologies that largely mimic the look of ordinary ink on paper. In contrast to conventional backlit displays, electronic paper displays typically reflect light, much as ordinary paper does. In addition, electronic paper displays are often bi-stable, meaning that these displays are capable of holding text or other rendered images even when very little or no power is supplied to the display. Some examples of the display 1002 that may be used with the implementations described herein include bi-stable LCD displays, micro electromechanical system (MEMS) displays, such as interferometric modulator displays, cholesteric displays, electrophoretic displays, electrofluidic pixel displays, electrowetting displays, photonic ink displays, gyricon displays, and the like. In other implementations, or for other types of devices 1000, the display 1002 may be an active display such as a liquid crystal display, a plasma display, a light emitting diode display, an organic light emitting diode display, and so forth. Accordingly, implementations herein are not limited to any particular display technology.

In one implementation, the display 1002 comprises an electrophoretic display that moves particles between different positions to achieve different color shades. For instance, in a pixel that is free from a color filter, the pixel may be configured to produce white when the particles within this pixel are located at the front (i.e., viewing) side of the display. When situated in this manner, the particles reflect incident light, thus giving the appearance of a white pixel. Conversely, when the particles are pushed near the rear of the display, the display absorbs the incident light and, hence, causes the pixel to appear black to a viewing user. In addition, the particles may situate at varying locations between the front and rear sides of the display to produce varying shades of gray. Furthermore, as used herein, a "white" pixel may comprise any shade of white or off white, while a "black" pixel may similarly comprise any shade of black.

In another implementation, the display 1002 comprises an electrophoretic display that includes oppositely charged light and dark particles. In order to create white, the display controller moves the light particles to the front side of the display by creating a corresponding charge at an electrode near the front and moves the dark particles to the back of the display by creating a corresponding charge at an electrode near the back. In order to create black, meanwhile, the controller changes the polarities and moves the dark particles to the front and the light particles to the back. Furthermore, to create varying shades of gray, the controller 1004 may utilize different arrays of both light and dark particles. In some cases, the particles may be contained in tiny individual transparent capsules, such as approximately 40 micrometers in diameter. The capsules are suspended in a fluid, such as a liquid polymer, between a transparent upper electrode grid layer and a lower electrode grid layer separated by a gap, such as approximately 50-200 micrometers.

In still another implementation, the display comprises an electrowetting display that employs an applied voltage to change the surface tension of a liquid in relation to a surface. For instance, by applying a voltage to a hydrophobic surface, the wetting properties of the surface can be modified so that the surface becomes increasingly hydrophilic. As one example of an electrowetting display, the modification of the surface tension acts as an optical switch by contracting a colored oil film when a voltage is applied to individual pixels of the display. When the voltage is absent, the colored oil forms a continuous film within a pixel, and the color may thus be visible to a user of the display. On the other hand, when the voltage is applied to the pixel, the colored oil is displaced and the pixel becomes transparent. When multiple pixels of the display are independently activated, the display can present a color or grayscale image. The pixels may form the basis for a transmissive, reflective, or transmissive/reflective (transreflective) display. Further, the pixels may be responsive to high switching speeds (e.g., on the order of several milliseconds), while employing small pixel dimensions. Accordingly, the electrowetting displays herein may be suitable for applications such as displaying video content. In addition, the lower power consumption of electrowetting displays in comparison to conventional LCD displays makes the technology suitable for displaying content on portable devices that rely on battery power.

Of course, while several different examples have been given, it is to be appreciated that the reflective displays described herein may comprise any other type of electronic-paper technology or reflective-display technology, examples of which are provided above. In addition, while some of the examples described above are discussed as rendering black, white, and varying shades of gray, it is to be appreciated that the described techniques apply equally to reflective displays capable of rendering color pixels. As such, the terms "white," "gray," and "black" may refer to varying degrees of color in implementations utilizing color displays. For instance, where a pixel includes a red color filter, a "gray" value of the pixel may correspond to a shade of pink while a "black" value of the pixel may correspond to a darkest red of the color filter. Furthermore, while some examples herein are described in the environment of a reflective display, in other examples, the display 1002 may represent a backlit display, examples of which are mentioned above.

In addition to including the display 1002, FIG. 10 illustrates that some examples of the device 1000 may include a touch sensor component 1006 and a touch controller 1008. In some instances, at least one touch sensor component 1006 resides with, or is stacked on, the display 1002 to form a touch-sensitive display (e.g., an electronic paper touch-sensitive display). Thus, the display 1002 may be capable of both accepting user touch input and rendering content in response to or corresponding to the touch input. As several examples, the touch sensor component 1006 may comprise a capacitive touch sensor, a force sensitive resistance (FSR), an interpolating force sensitive resistance (IFSR) sensor, or any other type of touch sensor. In some instances, the touch sensor component 1006 is capable of detecting touches as well as determining an amount of pressure or force of these touches.

FIG. 10 further illustrates that the electronic device 1000 may include one or more processors 1010 and one or more computer-readable media 1012, as well as a front light component 1014 (which may alternatively be a backlight component in the case of a backlit display) for lighting the display 1002, a cover layer component 1016, such as a cover glass or cover sheet, one or more communication interfaces 1018 and one or more power sources 1020. The communication interfaces 1018 may support both wired and wireless connection to various networks, such as cellular networks, radio, WiFi networks, short range networks (e.g., Bluetooth®), infrared (IR), and so forth.

Depending on the configuration of the electronic device 1000, the computer-readable media 1012 (and other computer-readable media described throughout) is an example of computer storage media and may include volatile and nonvolatile memory. Thus, the computer-readable media 1012 may include, but is not limited to, RAM, ROM, EEPROM, flash memory, or other memory technology, or any other medium that can be used to store computer-readable instructions, programs, applications, media items, and/or data which can be accessed by the electronic device 1000.

The computer-readable media 1012 may be used to store any number of functional components that are executable on the processor 1010, as well as content items 1022 and applications 1024. Thus, the computer-readable media 1012 may include an operating system and a storage database to store one or more content items 1022, such as eBooks, audio books, songs, videos, still images, and the like. The computer-readable media 1012 of the electronic device 1000 may also store one or more content presentation applications to render content items on the device 1000. These content presentation applications may be implemented as various applications 1024 depending upon the content items 1022. For instance, the content presentation application may be an electronic book reader application for rending textual electronic books, an audio player for playing audio books or songs, a video player for playing video, and so forth.

In some instances, the electronic device 1000 may couple to a cover (not shown in FIG. 10) to protect the display (and other components in the display stack or display assembly) of the device 1000. In one example, the cover may include a back flap that covers a back portion of the device 1000 and a front flap that covers the display 1002 and the other components in the stack. The device 1000 and/or the cover may include a sensor (e.g., a Hall Effect sensor) to detect when the cover is open (i.e., when the front flap is not atop the display and other components). The sensor may send a signal to the front light component 1014 when the cover is open and, in response, the front light component 1014 may illuminate the display 1002. When the cover is closed, meanwhile, the front light component 1014 may receive a signal indicating that the cover has closed and, in response, the front light component 1014 may turn off.

Furthermore, the amount of light emitted by the front light component 1014 may vary. For instance, upon a user opening the cover, the light from the front light may gradually increase to its full illumination. In some instances, the device 1000 includes an ambient light sensor (not shown in FIG. 1) and the amount of illumination of the front light component 1014 may be based at least in part on the amount of ambient light detected by the ambient light sensor. For example, the front light component 1014 may be dimmer if the ambient light sensor detects relatively little ambient light, such as in a dark room; may be brighter if the ambient light sensor detects ambient light within a particular range; and may be dimmer or turned off if the ambient light sensor detects a relatively large amount of ambient light, such as direct sunlight.

In addition, the settings of the display 1002 may vary depending on whether the front light component 1014 is on or off, or based on the amount of light provided by the front light component 1014. For instance, the electronic device 1000 may implement a larger default font or a greater contrast when the light is off compared to when the light is on. In some instances, the electronic device 1000 maintains, when the light is on, a contrast ratio for the display that is within a certain defined percentage of the contrast ratio when the light is off.

As described above, the touch sensor component 1006 may comprise a capacitive touch sensor that resides atop the display 1002. In some examples, the touch sensor component 1006 may be formed on or integrated with the cover layer component 1016. In other examples, the touch sensor component 1006 may be a separate component in the stack of the display assembly. The front light component 1014 may reside atop or below the touch sensor component 1006. In some instances, either the touch sensor component 1006 or the front light component 1014 is coupled to a top surface of a protective sheet 1026 (e.g., such as cover layer 118, shown in FIG. 1) of the display 1002. As one example, the front light component 1014 may include a light guide and a light source (e.g., as shown in FIG. 1). The light guide may comprise a substrate (e.g., a transparent thermoplastic such as PMMA or other acrylic), a layer of lacquer and multiple grating elements formed in the layer of lacquer that function to propagate light from the light source towards the display 1002, thus illuminating the display 1002.

The cover layer component 1016 may include a transparent substrate or sheet having an outer layer that functions to reduce at least one of glare or reflection of ambient light incident on the electronic device 1000. In some instances, the cover layer component 1016 may comprise a hard-coated polyester and/or polycarbonate film, including a base polyester or a polycarbonate, that results in a chemically bonded UV-cured hard surface coating that is scratch resistant. In some instances, the film may be manufactured with additives such that the resulting film includes a hardness rating that is greater than a predefined threshold (e.g., at least a hardness rating that is resistant to a 3 h pencil). Without such scratch resistance, a device may be more easily scratched and a user may perceive the scratches from the light that is dispersed over the top of the reflective display. In some examples, the protective sheet 1026 may include a similar UV-cured hard coating on the outer surface. The cover layer component 1016 may couple to another component or to the protective sheet 1026 of the display 1002. The cover layer component 1016 may, in some instances, also include a UV filter, a UV-absorbing dye, or the like, for protecting components lower in the stack from UV light incident on the electronic device 1000. In still other examples, the cover layer component 1016 may include a sheet of high-strength glass having an antiglare and/or antireflective coating.

The display 1002 includes the protective sheet 1026 overlying an image-displaying component 1028. For example, the display 1002 may be preassembled to have the protective sheet 1026 as an outer surface on the upper or image-viewing side of the display 1002. Accordingly, the protective sheet 1026 may be integral with and may overlie the image-displaying component 1028. The protective sheet 1026 may be optically transparent to enable a user to view, through the protective sheet 1026, an image presented on the image-displaying component 1028 of the display 1002.

In some examples, the protective sheet 1026 may be a transparent polymer film in the range of 25 to 200 micrometers in thickness. As several examples, the protective sheet may be a transparent polyester, such as PET or PEN, or other suitable transparent polymer film or sheet, such as a polycarbonate or an acrylic. In some examples, the outer surface of the protective sheet 126 may include a coating, such as the hard coating described above. For instance, the hard coating may be applied to the outer surface of the protective sheet 1026 before or after assembly of the protective sheet 1026 with the image-displaying component 1028 of the display 1002. In some examples, the hard coating may include a photoinitiator or other reactive species in its composition, such as for curing the hard coating on the protective sheet 1026. Furthermore, in some examples, the protective sheet 1026 may be dyed with a UV-light-absorbing dye, or may be treated with other UV-absorbing treatment. For example, the protective sheet may be treated to have a specified UV cutoff such that UV light below a cutoff or threshold wavelength is at least partially absorbed by the protective sheet 1026, thereby protecting the image-displaying component 1028 from UV light.

According to some implementations herein, one or more of the components discussed above may be coupled to the display 1002 using a LOCA. For example, suppose that the light guide portion of the front light component 1014 is to be coupled to the display 1002. The light guide may be coupled to the display 1002 by placing the LOCA on the outer or upper surface of the protective sheet 1026. When the LOCA reaches the corner(s) and/or at least a portion of the perimeter of protective sheet, UV-curing may be performed on the LOCA at the corners and/or the portion of the perimeter. Thereafter, the remaining LOCA may be UV-cured and the front light component 1014 may be coupled to the LOCA. By first curing the corner(s) and/or perimeter, the techniques effectively create a barrier for the remaining LOCA and also prevent the formation of air gaps in the LOCA layer, thereby increasing the efficacy of the front light component 1014. In other implementations, the LOCA may be placed near a center of the protective sheet 1026, and pressed outwards towards a perimeter of the top surface of the protective sheet 126 by placing the front light component 1014 on top of the LOCA. The LOCA may then be cured by directing UV light through the front light component 1014. As discussed above, various techniques, such as surface treatment of the protective sheet, may be used to prevent discoloration of the LOCA and/or the protective sheet 1026.

While FIG. 10 illustrates a few example components, the electronic device 1000 may have additional features or functionality. For example, the device 1000 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data. In addition, some or all of the functionality described as residing within the device 1000 may reside remotely from the device 1000 in some implementations. In these implementations, the device 1000 may utilize the communication interfaces 1018 to communicate with and utilize this functionality.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications can be made, and equivalents can be substituted, without departing from claimed subject matter. Additionally, many modifications can be made to adapt a particular situation to the teachings of claimed subject matter without departing from the central concept described herein. Therefore, it is intended that claimed subject matter not be limited to the particular embodiments disclosed, but that such claimed subject matter can also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter can be practiced without these specific details. In other instances, methods, apparatuses, or systems that would be known by one of ordinary skill have not been described in detail so as not to obscure claimed subject matter.

Reference throughout this specification to "one embodiment" or "an embodiment" can mean that a particular feature, structure, or characteristic described in connection with a particular embodiment can be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described can be combined in various ways in one or more embodiments. In general, of course, these and other issues can vary with the particular context of usage. Therefore, the particular context of the description or the usage of these terms can provide helpful guidance regarding inferences to be drawn for that context.

What is claimed is:

1. A display device comprising:
a light source;
a display panel;
a light guide to collect light from the light source and to transport the light via total internal reflection, wherein a first surface of the light guide includes recessed regions having a surface with a circular-based profile to reflect at least a portion of the light from the light guide to the display panel, wherein material substantially filling the recessed regions has a first refractive index and the light guide has a second refractive index, and wherein the light that is reflected from the light guide reflects off the surface with the circular-based profile two or more times based, at least in part, on a difference between the first refractive index and the second refractive index;
a first layer covering at least a portion of the first surface of the light guide, wherein a portion of the first layer fills the recessed regions included in the first surface of the light guide; and
a second layer having a refractive index lower than a refractive index of the light guide, wherein the second layer covers at least a portion of a second surface of the light guide to transmit the reflected light to the display panel, and wherein the second surface of the light guide is opposite to the first surface of the light guide.

2. The display device of claim 1, wherein the reflected light is directed from the light guide to the display panel to at least approximately uniformly illuminate the display panel.

3. The display device of claim 1, wherein alignment of the recessed regions of the first surface of the light guide is dithered to be different from alignment of rows and columns of pixels of the display panel to avoid a Moire effect.

4. The display device of claim 1, wherein the material having the first refractive index completely fills the recessed regions.

5. A device comprising:
   a light guide to collect light from one or more light sources and to transport the light via total internal reflection, wherein the light guide includes a first surface and a second surface opposite to the first surface; and
   a first layer covering at least a portion of the first surface of the light guide, wherein the first layer includes microstructures with a surface having a circular-based profile in the first surface of the light guide, and wherein a light ray exiting the light guide is reflected by the surface having the circular-based profile two or more times based, at least in part, on a difference between a refractive index of the first layer and a refractive index of the light guide.

6. The device of claim 5, further comprising:
   a display panel; and
   a second layer having a refractive index lower than a refractive index of the light guide, wherein the second layer covers at least a portion of the second surface of the light guide to transmit the reflected light to the display panel.

7. The device of claim 6, wherein the reflected light is directed from the light guide to the display panel to at least approximately uniformly illuminate the display panel.

8. The device of claim 6, wherein alignment of the microstructures of the first layer is different from alignment of rows and columns of pixels of the display panel to avoid a Moire effect.

9. The device of claim 5, wherein the circular-based profile has a radius of curvature at least approximately equal to a depth that the microstructures extend into the first surface of the light guide.

10. The device of claim 5, wherein the lightguide has a thickness that is substantially uniform and wherein a depth that the microstructures protrude into the first surface of the light guide is less than about 2% the thickness of the light guide.

11. The device of claim 5, wherein the first layer includes more than about 100,000 microstructures that collectively comprise a textured surface at an interface between the first layer and the light guide.

12. The device of claim 5, wherein the circular-based profile comprises a quarter-circle profile.

13. The device of claim 5, wherein the refractive index of the first layer is less than the refractive index of the light guide.

14. The device of claim 5, wherein the device is incorporated in a display, the device further comprising:
   one or more processors;
   one or more memories; and
   display software stored on the one or more memories and operable on the one or more processors to modulate the light exiting the light guide.

15. A method for fabricating a display device, the method comprising:
   imprinting portions of a surface of a light guide to form recessed regions that include a surface having a circular-based profile that is configured to outcouple a light ray travelling in the light guide by reflecting the light ray two or more times;
   substantially filling the recessed regions with a fill material having a refractive index that is lower than a refractive index of the light guide; and
   at least partially covering the light guide with a layer having a refractive index that is lower than the refractive index of the light guide.

16. The method of claim 15, wherein the circular-based profile comprises a quarter-circle profile.

17. The method of claim 15, wherein the lightguide has a thickness that is substantially uniform and wherein a depth that the recessed regions protrude into the surface of the light guide is less than about 2% the thickness of the light guide.

18. The method of claim 15, wherein the refractive index of the layer is the same as the refractive index of the fill material.

19. The method of claim 15, wherein a depth of the recessed regions is at least approximately equal to a radius of curvature of the circular-based profile.

\* \* \* \* \*